United States Patent [19]

Ufermann et al.

[11] 4,341,135

[45] Jul. 27, 1982

[54] METHOD OF AND APPARATUS FOR CUTTING A PLATE INTO SMALL SECTIONS

[75] Inventors: Werner Ufermann, Bernried, Fed. Rep. of Germany; Rolf Grzymek, Marietta, Ga.

[73] Assignee: G. Siempelkamp GmbH & Co., Krefeld, Fed. Rep. of Germany

[21] Appl. No.: 174,700

[22] Filed: Aug. 1, 1980

[30] Foreign Application Priority Data

Aug. 4, 1979 [DE] Fed. Rep. of Germany ....... 2931780

[51] Int. Cl.$^{3}$ ......................... B26D 3/16; B29C 17/10

[52] U.S. Cl. ........................................... 83/23; 83/35; 83/152; 83/155.1; 83/256; 83/277; 83/404.2; 83/71

[58] Field of Search ................ 83/35, 152, 268, 404.2, 83/155.1, 78, 256, 255, 277, 23, 71

[56] References Cited

U.S. PATENT DOCUMENTS 1,665,209 4/1928 Huston .................................... 83/35
3,662,798 5/1972 Campbell .......................... 83/277 X
3,688,619 9/1972 Yabuta .................................... 83/35
3,826,164 7/1974 Campbell ................................ 83/23
4,040,318 8/1977 Makeev et al. ......................... 83/71
4,206,670 6/1980 Benuzzi ............................. 83/404.2
4,286,486 9/1981 Franks .................................... 83/23

*Primary Examiner*—Donald R. Schran
*Attorney, Agent, or Firm*—Karl F. Ross

[57] ABSTRACT

A large rectangular plate is subdivided into small rectangular sections in a system wherein the plate is fed stepwise in a main direction through an upstream shear while the downstream end portion of the plate is seized immediately downstream of the shear with each advanced step. Between the advanced steps the end portions are sheared off and then displaced in the main direction to the upstream end of a conveyor where they are deposited one after the other. The conveyor displaces the sheared-off end portions until each one is positioned above a respective aligner spaced apart in the main direction. The conveyor lowers these sections onto the aligners and the aligners then align them perfectly perpendicular to the main direction. The aligned and sheared-off end portions are then pushed jointly in a transverse direction perpendicular to the main direction stepwise to a downstream shear while they are supported and pneumatically seized at their downstream ends immediately downstream of the downstream shear. The downstream shear then cuts off these downstream ends which are displaced to a collection location and deposited there.

8 Claims, 4 Drawing Figures

METHOD OF AND APPARATUS FOR CUTTING A PLATE INTO SMALL SECTIONS

FIELD OF THE INVENTION

The present invention relates to a method of and an apparatus for subdividing a large rectangular plate into a plurality of small rectangular sections. More particularly this invention concerns an automatic system for subdividing a large rectangular laminate into small perfectly rectangular sections.

BACKGROUND OF THE INVENTION

In industry it is frequently necessary to cut a large-format rectangular plate up into a plurality of small rectangular plates. This is done, for instance, to make a plurality of printed-circuit boards from a large phenolic-resin laminate plate. An essential requirement of such systems is that the small plates be perfectly rectangular and have side dimensions which correspond exactly to the required sizes.

This procedure is normally done by means of separate shears. The starting workpiece is a large rectangular plate which is advanced stepwise in a main transport direction through a shear. With each step the shear cuts a strip off the end of the plate, it being a relatively easy job to ensure that these strips are all of identical length measured in the main transport direction.

Immediately downstream of this shear is a support arrangement which has a plurality of support feet which can be pneumatically moved upward and downward between parallel conveyor belts extending in the transport direction. They support the downstream end portion of the plate prior to and during cutting, so as principally to prevent the plate from bowing up underneath the blade of the shear. After shearing-off of the downstream end portions these support feet drop down to deposit the sheared-off end portions on a continuously driven conveyor belts which displace them downstream away from the shear. The conveyor belts can drop the sheared-off end portions on another conveyor or simply push them all up against an alignment bar.

The standard procedure is then to take the sheared-off end portions and manually advance them through yet another shear so as to cut them into pieces of the desired size. It has been suggested to then fit them manually into yet another apparatus which automatically shears them into the desired size, but this procedure has been found virtually as time-consuming as the manual shearing operation.

The obvious disadvantage of the above-described method and apparatus is that production costs are relatively high due to carrying out many of the steps manually. Furthermore the manual operation slows the entire procedure down greatly so that production speed is limited. Finally even if the slow speed and high labor costs could be tolerated, the finished product is normally not exactly to the desired dimensions, so that further monitoring steps are necessary to separate out the inaccurately cut sections.

OBJECTS OF THE INVENTION

It is therefore an object of the present invention to provide an improved method of and apparatus for subdividing a large rectangular plate into a plurality of small rectangular sections.

Another object is to provide a fully automatic system for thus subdividing a large rectangular plate.

SUMMARY OF THE INVENTION

These objects are attained in a system wherein a large rectangular plate is fed stepwise in a main direction to an upstream shear while its downstream end portion is supported and pneumatically seized immediately downstream of the shear with each advanced step. The supported and pneumatically seized downstream end portions are sheared off the plate between the advance steps, and the sheared-off, supported, and seized end portions are then displaced in the main direction immediately after each is sheared off the plate to the upstream end of a conveyor and are deposited one after another on this conveyor. The conveyor moves the sheared-off end portions in the main direction until each one is positioned over a respective aligner, the aligners being spaced apart in the main direction. The conveyor then lowers and deposits the sheared-off end portions on the respective aligners which are then operated to align these sheared-off end portions with a transverse direction perpendicular to the main direction.

The aligned and sheared-off end portions are then jointly displaced in this transverse direction perpendicular to the main direction stepwise through a downstream shear while once again their downstream ends are supported and pneumatically seized immediately downstream of the downstream shear with each transverse advance step. The supported and pneumatically seized downstream ends are sheared off the end portions between the transverse advance steps, and the sheared-off, supported, and pneumatically seized downstream ends are then displaced in the transverse direction to a collection location and deposited there.

Thus with the system according to the instant invention the strips constituting the end portions are positively held by the pneumatic grab and are displaced downstream away from the shear in a positive manner, insuring that their positioning remains under good control. Automatic machinery aligns these end portions so that their edges are all perfectly parallel and parallel to the transverse displacement direction, and then a common pusher, which simultaneously also aligns their leading and trailing edges relative to this transverse direction, pushes them in steps through the second shears so that perfectly dimensioned pieces are cut off them. It is possible in this manner to produce small rectangular sections whose dimensions can be made to correspond to extremely close tolerances. Normally these sections are pieces having length and width dimensions equal to whole-number fractions of the length and width dimensions of the initial workpiece, so that this initial workpiece is cut up into a whole number of pieces with no waste. The accuracy of the system is so great that once it is set up it can be counted on to produce accurately dimensioned pieces without any supervision or monitoring at all.

The invention can also operate at extremely high speeds because the downstream end portions of the plate are positively pneumatically held, rather than simply being supported, so that rapid cycling speed is possible. The pneumatic seizing according to this invention is carried out by means of suction-cup arrangements which cling to the face of the plate and which are carried on carriages that can reciprocate in the respective advance directions. Obviously when thus pneumatically seized the workpieces can be moved at substantially greater speeds with substantially greater accuracy than is possible when they are simply rested on conveyor belts or the like. Furthermore aligning all of the portions parallel to each other, then aligning their trailing and leading edges, relative to the transport direction, parallel to each other by pushing them through the downstream shear with a common pusher having a pusher arranged perfectly perpendicular to this transverse direction greatly increases output of the device by simultaneously cutting several pieces at a time. Normally in the prior-art systems the second subdivision takes much longer than the first subdivision, as the strips produced by the first subdivision must be cut up one by one.

The aligner according to this invention comprises two pairs of parallel bars extending parallel to the main transport direction and perpendicular to the transverse transport direction. One of the pairs is spaced well upstream of the other pair in the secondary transport direction and the bars carry upstanding pins. Each pair is also associated with a crank structure which can oppositely displace the bars of the respective pair perpendicular to the secondary transport directions so as to move the pins of the one bar in one direction and the pins of the other bar in the opposite direction. The downstream end of the conveyor can lower the strip end portions down onto these bars, with each portion lying relative to the transverse transport direction at its upstream end between a pair of pins and on its downstream end between a pair of pins. Displacing of these pins toward each other will automatically align the strip end portions so that they lie perfectly perpendicular to the main transport direction and perfectly parallel to the transverse transport direction. Such aligners act effectively in the system according to the instant invention where relatively accurate positioning of the strip end portions between the respective pairs of pins is certain. The pusher then engages the upstream ends, relative to the transverse direction, of these strips to align them all with one another in a direction perpendicular to this transverse transport direction, and then grips them while advancing them stepwise through the downstream shear which, therefore, accurately cuts pieces off their ends.

SPECIFIC DESCRIPTION

The system according to this invention subdivides large rectangular plates P into end-portion strips S and then subdivides these end-portion strips S into small rectangular pieces Z.

Figure 1:
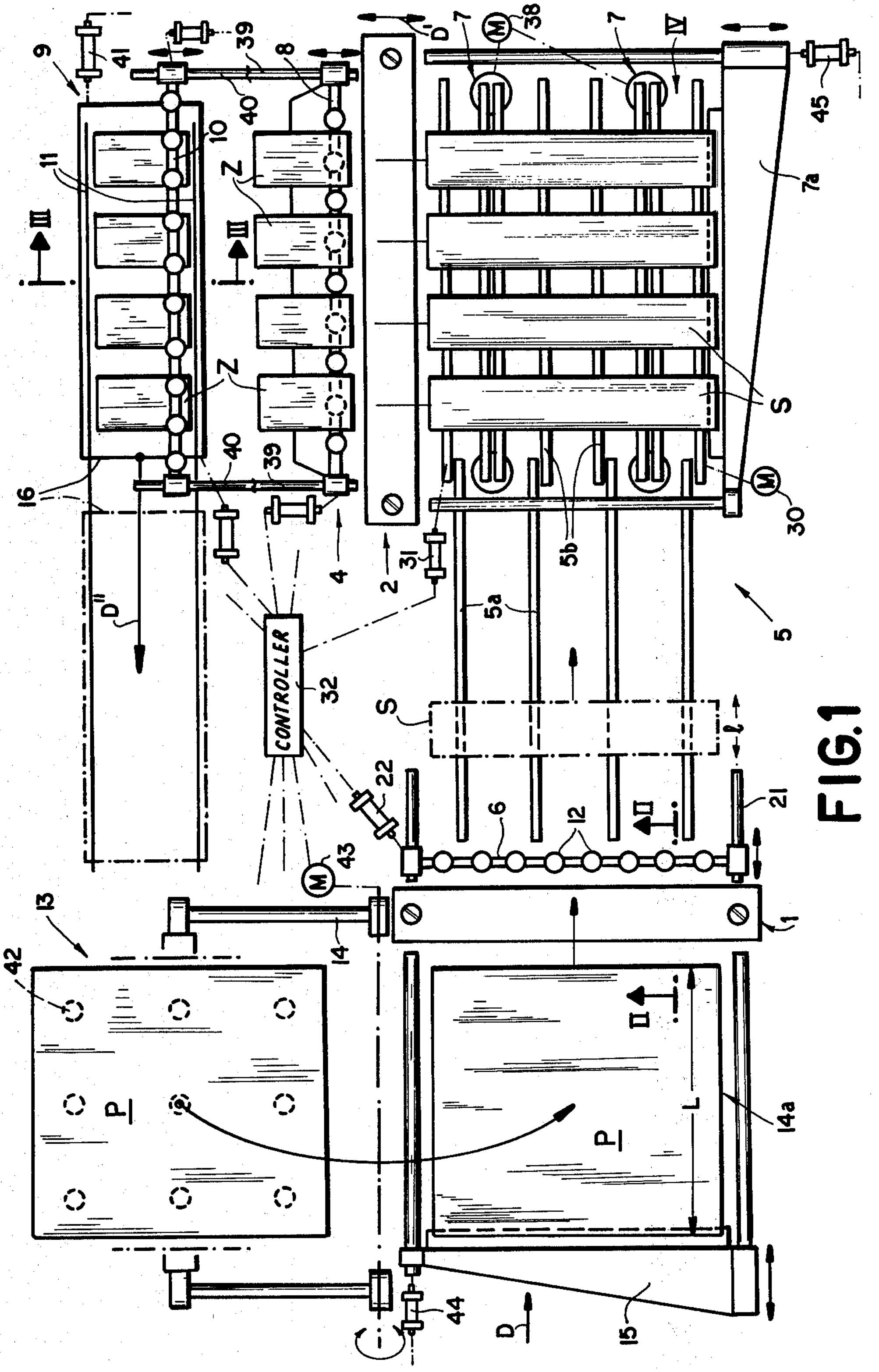
FIG. 1 is a partly schematic top view of the apparatus for carrying out the method according to the instant invention.
Figure 2:
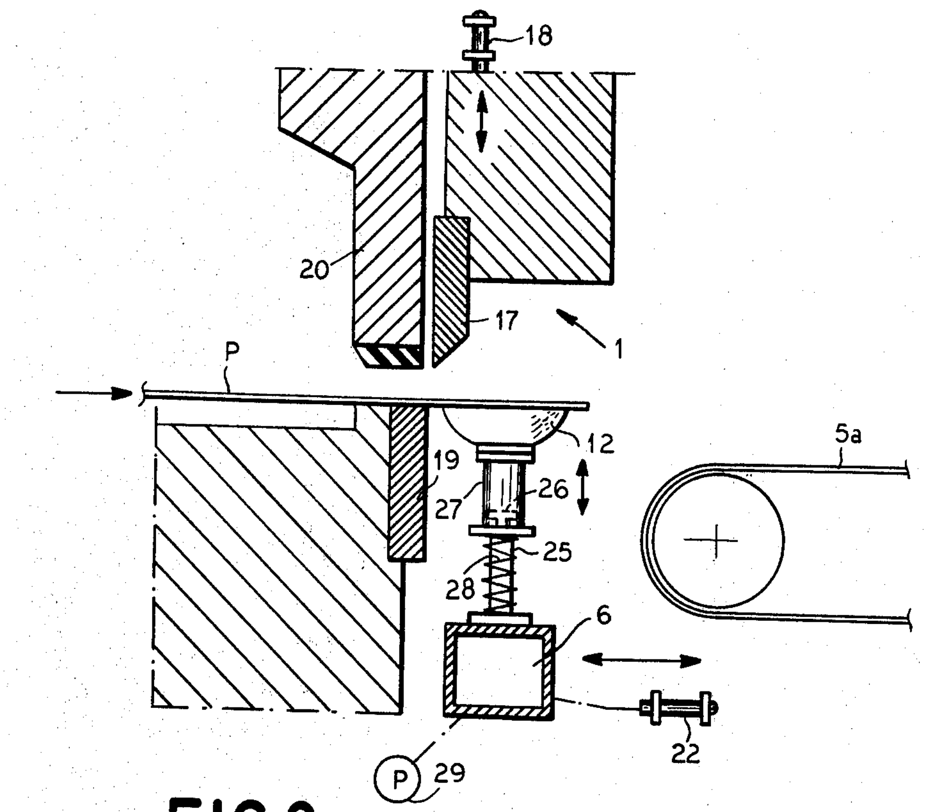
FIGS. 2 and 3 are large-scale sections taken respectively along lines II—II and III—III of FIG. 1.

The system has an upstream shear 1 constituted as seen in FIG. 2 of a blade 17 vertically displaceable by means of an actuator 18, here constituted as a pneumatic cylinder, relative to an anvil 19. A holddown bar 20 clamps the plate P to the anvil 19 before the blade 17 is reciprocated past it to slice a strip S off it. The plate P is passed in a main transport direction D through this shear, and the strips S thus produced are subsequently displaced perpendicular to the direction D in a transverse direction D' through a second such shear 2 identical to the shear 1. Immediately downstream of the shears 1 and 2 the workpieces are supported by respective suction devices 3 and 4 each having, as also seen in FIG. 2, a horizontal beam 6 or 8, reciprocal in the respective transport directions D and D' on rails 21 by means of respective cylinders 22 and 23. Each beam carries a plurality of upstanding tubes 25 formed at their upper ends as pistons 26 received in closed cylinders 27 urged upwardly by springs 28. Small orifices communicate between these closed cylinders 27 and the interior of elastomeric suction cups 12 opening upwardly. Thus when suction is applied, as for example by means of a pump 29, to the beams 6 the suction cups 12 rise up somewhat, and when they engage the underside of the plate P or a strip S they will adhere tightly thereto.

Extending in the direction D between the shear 1 and an alignment arrangement 7 is a conveyor 5 constituted by a plurality of upstream conveyor belts 5*a* and downstream conveyor belts 5*b*, all driven by a motor 30. The downstream belt or stretch 5*b* is also vertically displaceable by means of a cylinder 31 controlled, like the cylinders 22 and 23 and the pump 29 from a central computer-type controller 32.

Figure 4:
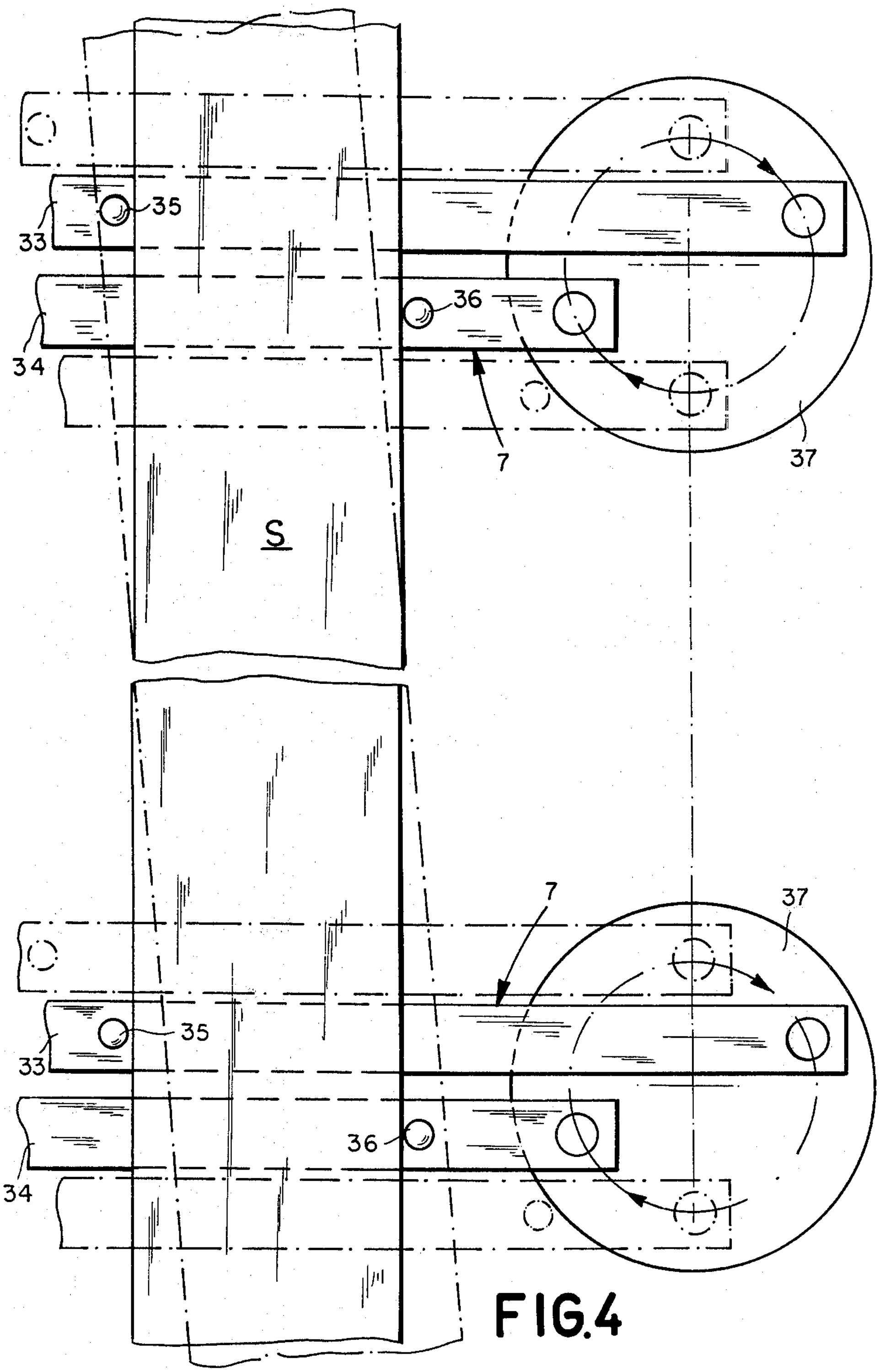
FIG. 4 is a top view of the detail indicated at IV in FIG. 1.

The alignment apparatus 7 as best seen in FIG. 4 comprises two identical sets of bars 33 and 34 carrying respective pins 35 and 36. The bars 33 and 34 are mounted via respective eccentric pivots on disks 37 operated by a motor 38 so that when the disks 37 are rotated in one direction (clockwise in FIG. 4) each pin 35 approaches a respective pin 36, whereas when rotated in the opposite direction each pin 35 moves away from the respective pin 36.

Figure 3:
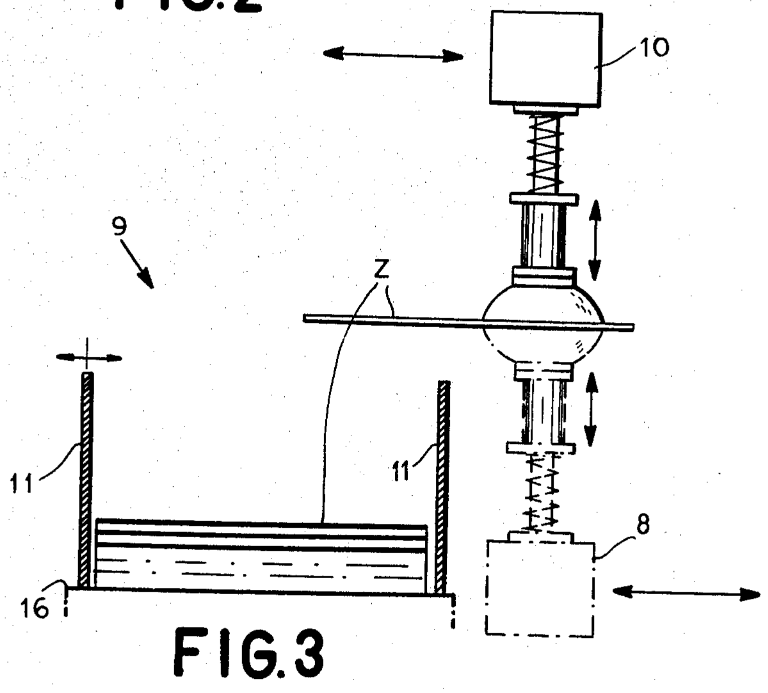

The suction device 4 downstream of the downstream shear 2 is substantially identical to the suction device 3 downstream of the shear 1. It rides on rails 39 that are beneath rails 40 for another suction device 9 having a beam 10 identical to the beams 8 and 6 of the devices 4 and 3, respectively. The only difference is that the suction beam 10 operates as seen in FIG. 3 from above from an upstream position immediately downstream of the shear 1 to a downstream position above a table 16 having a pair of side walls 11 adapted to receive the pieces Z. The table 16 can be displaced in a direction D'' parallel to the direction D but opposite thereto. A cylinder 41 can thus reciprocate the support 16.

In use plates P are loaded onto the arrangement by a pivotal loader 14 which picks them up via suction lifters 42 from a supply location 13, a motor 43 also operated by the controller 32 operating this loader 14. The plate P is therefore deposited on a table 14*a*, normally formed by a plurality of small rollers, immediately upstream of the shear 1. A pusher 15 operated by a cylinder 44 first engages the upstream edge of the plate P to align it perfectly perpendicular to the direction D and then grips this edge. The cylinder 44 is then operated synchronously with the shear 1 to displace the plate P through the shear 1 and cut strips S from its downstream end. These strips S have a length 1 equal here to exactly one-quarter of the overall length L in the direction D of the plate P.

With each operation of the shear 1 the suction device 3 engages the portion S before it is cut off, supporting it and pneumatically seizing it with the suction cups 12, and then moves it downstream in the direction D to deposit it on the upstream end of the upstream conveyor belts 5*a*. Furthermore with each cycle of the machine the controller 32 operates the motor 30 for the conveyor 5 to displace the upper reaches of the belts 5a and 5b downstream of the direction D through a distance equal to somewhat more than the length 1.

This procedure is repeated four times until the entire plate P has been cut up into four strips S, the last strip simply being pushed through the open shear 1 by the feeder 15. These four strips are automatically aligned by the conveyor 5 roughly above the alignment device 7, each strip S lying between two pins 35 and two pins 36, which are set at their widest spacings. The cylinder 31 then lowers the downstream portion 5b of the conveyor 5 to deposit these strips S on the alignment device 7, and the motor 38 is then operated to grab the strip S between the pins 35 and 36 and align them perfectly with the direction D′ which is perpendicular to the direction D. A pusher 7a operated by a cylinder 45 functions identically to the device 15 to first align the trailing edges of the strips S, relative to the direction D′, so that they are in perfect alignment with one another, then grips these rear edges and pushes the strips S in the direction D′ through the downstream shear 2 in three or four steps, the shear 2 closing and cutting sections Z from the strips S with each advanced step.

Immediately downstream of the shear 2 the supporter and pneumatic holder 4 grips the underside of these sections Z before and after they are cut from the strips Z. As soon as the shearing operation is complete the cylinder 23 displaces the pieces Z downstream in the direction D′ to hand them off to the suction device 9 having the beam 10. They are then dropped down into the box forming the table 16 between the wall 11. Once a complete supply is present on the table 16 it is moved downstream and replaced by an empty such table so that the operation can continue uninterruptedly.

As a result of the pneumatic holding and displacing between the various stages according to this invention it is possible to very accurately displace and, therefore, cut the workpieces. Due to the positive gripping by the pneumatic cups 12 the workpieces can be moved relatively rapidly for extremely fast cycling of the device. The alignment device 7 compensates for any minor misalignments of the strips S and ensures that they are fed perfectly through the shear 2. As a result the pieces Z will be perfectly rectangular and will have dimensions controlled to extremely close tolerances.

We claim:

1. A method of subdividing a large rectangular plate into a plurality of small rectangular sections, said method comprising the steps of:

feeding said plate stepwise in a main direction through an upstream shear while supporting and pneumatically seizing the downstream end portion of said plate immediately downstream of said shear with each advance step;

shearing the supported and seized downstream end portions off said plate between the advance steps;

displacing the sheared-off, supported, and seized end portions in said main direction immediately after each is sheared off said plate to the upstream end of a conveyor and depositing them one after another on said conveyor;

displacing the sheared-off end portions with said conveyor in said main direction until each one is positioned over a respective aligner spaced apart in said main direction;

lowering said conveyor and thereby depositing the sheared-off end portions on the respective aligners;

aligning the sheared-off end portions on said aligners with said aligners perpendicular to said main direction;

pushing the aligned and sheared-off end portions jointly in a transverse direction perpendicular to said main direction stepwise through a downstream shear while supporting and pneumatically seizing the downstream ends of said end portions immediately downstream of said downstream shear with each transverse advance step;

shearing the supported and pneumatically seized downstream ends off said downstream end portion between the transverse advance steps; and displacing the sheared-off, supported, and pneumatically seized downstream ends in said transverse direction to a collection location and depositing same in said collection location.

2. An apparatus for subdividing a large rectangular plate into a plurality of small rectangular sections, said apparatus comprising:

means for feeding said plate stepwise in a main feed direction through an upstream shear station;

means including an upstream shear at said upstream station for shearing the downstream end portion off said plate with each advance step;

an upstream carriage reciprocal in said main direction between an upstream position immediately downstream of said upstream shear and a downstream position downstream from said upstream position a conveyor extending in said main direction having an upstream stretch having an upstream end at said downstream position and a downstream stretch downstream in said main direction from said upstream stretch;

means including a pneumatic device on said upstream carriage for supporting and pneumatically seizing said downstream end portions on said carriage;

means for reciprocating said carriage between said upstream and downstream position synchronously with shearing-off of said end portions for displacing same downstream and depositing same one after the other on said upstream stretch of said conveyor;

a plurality of alignment tools underneath said downstream stretch and spaced apart in said main direction;

means for lowering said downstream stretch periodically and thereby depositing said end portions on respective alignment tools;

means for operating said alignment tools and thereby aligning end portions deposited thereon to be perpendicular to said main direction;

means including a pusher for pushing said end portions from said alignment tools in a transverse direction perpendicular to said main direction stepwise through a downstream shear station;

means including a downstream shear at said downstream shear station for shearing the ends off said end portions with each transverse advance step;

a downstream carriage reciprocal in said transverse direction between an upstream position immediately downstream of said downstream shear and a downstream position downstream therefrom in said transverse direction and above a deposition location;

means for including a plurality of pneumatic devices on said downstream carriage for supporting and pneumatically seizing said downstream ends of said end portions; and means for reciprocating said downstream carriage between the respective upstream and downstream positions synchronously with the shearing off of said ends for displacing same downstream and depositing same in said deposition location.

3. The apparatus defined in claim 2 wherein said alignment tools are each two pairs of upstanding pins, each pin of each pair being spaced in said main direction and displaceable in said main direction relative to the other pin of the respective pair and each pair of each tool being offset in said transverse direction relative to the other pair of the respective tool, said means for operating said tools including means for displacing said pins synchronously toward and away from each other.

4. The apparatus defined in claim 3 wherein said means for operating said tools includes rotatable members having offcenter pivots and bars carrying said pins and connected at said offcenter pivots to said rotatable members.

5. The apparatus defined in claim 2 wherein said pneumatic devices include suction cups engageable flatly with said portions and ends and means for aspirating air from inside said suction cups to adhere same to said portions and ends and thereby pneumatically seize same.

6. The apparatus defined in claim 5 wherein each carriage includes a suction beam constituting part of said means for aspirating and carrying the respective suction cups.

7. The apparatus defined in claim 2 wherein said means for feeding includes a gripper for the upstream edge of said plate.

8. The apparatus defined in claim 2 wherein said conveyor includes upstream belts constituting said upstream stretch and downstream belts constituting said downstream stretch, said pneumatic device of said upstream carriage including respective pluralities of suction cups interleaved with said upstream belts.

* * * * *